US012579159B2

(12) United States Patent
Budjade et al.

(10) Patent No.: US 12,579,159 B2
(45) Date of Patent: Mar. 17, 2026

(54) FILE EXTRACTION AND VECTORIZATION FOR ONBOARDING WITH LLM

(71) Applicant: Intuit Inc., Mountain View, CA (US)

(72) Inventors: Gaurav Budjade, Santa Clara, CA (US); Sujay Sundaram, San Jose, CA (US); Anjaneya Murthy Gabbiti, San Jose, CA (US); Pushparaj Shanmugam, San Jose, CA (US); Neha Kumari, Los Gatos, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/382,606

(22) Filed: Oct. 23, 2023

(65) Prior Publication Data

US 2025/0131004 A1      Apr. 24, 2025

(51) Int. Cl.
*G06F 16/25*          (2019.01)
*G06N 3/0455*        (2023.01)

(52) U.S. Cl.
CPC ......... *G06F 16/254* (2019.01); *G06N 3/0455* (2023.01)

(58) Field of Classification Search
None
See application file for complete search history.

(56) References Cited

U.S. PATENT DOCUMENTS

| | | | | |
|---|---|---|---|---|
| 11,983,763 | B1 * | 5/2024 | Thurairatnam | G06Q 20/202 |
| 12,020,045 | B1 * | 6/2024 | Wilson | G06F 9/44521 |
| 12,086,826 | B1 * | 9/2024 | Swett | G06Q 20/326 |
| 2004/0102976 | A1 * | 5/2004 | Pochueva | G06F 3/1284 |
| | | | | 704/270.1 |
| 2014/0283122 | A1 * | 9/2014 | Brunn | G06F 21/64 |
| | | | | 726/28 |
| 2015/0046259 | A1 * | 2/2015 | Hicken | G06Q 30/0256 |
| | | | | 705/14.54 |
| 2015/0262069 | A1 * | 9/2015 | Gabriel | G06F 16/9535 |
| | | | | 706/48 |
| 2017/0250930 | A1 * | 8/2017 | Ben-Itzhak | G06F 3/0488 |
| 2018/0052884 | A1 * | 2/2018 | Kale | G06F 16/242 |
| 2018/0068031 | A1 * | 3/2018 | Hewavitharana | G06F 9/30156 |
| 2019/0057087 | A1 * | 2/2019 | Dandamudi | G06F 16/93 |
| 2020/0334735 | A1 * | 10/2020 | Scully | G06Q 30/0631 |
| 2021/0090694 | A1 * | 3/2021 | Colley | G16B 30/00 |
| 2021/0209682 | A1 * | 7/2021 | Jain | H04L 9/0637 |
| 2022/0038570 | A1 * | 2/2022 | Stegall | G06Q 20/227 |
| 2023/0074406 | A1 * | 3/2023 | Baeuml | G06F 16/90332 |

(Continued)

*Primary Examiner* — Khanh B Pham
*Assistant Examiner* — Navneet Gmahl
(74) *Attorney, Agent, or Firm* — Paradice & Li LLP

(57) ABSTRACT

Systems and methods for adapting an onboarding session to a user are disclosed. An example method is performed by one or more processors of a system and includes receiving a transmission over a communications network from a computing device associated with a user of the onboarding system, the transmission including one or more files, extracting data from each of the one or more files using one or more parser plugins, transforming the extracted data into a set of arrays, feeding a prompt including the set of arrays to a large language model (LLM), inferring characteristics of the user based on a response to the prompt from the LLM, mapping the inferred characteristics to a predefined list of system features, and optimizing components of an onboarding session for the user based on the mapping.

20 Claims, 3 Drawing Sheets

(56) References Cited

U.S. PATENT DOCUMENTS

| | | | | |
|---|---|---|---|---|
| 2023/0134651 A1* | 5/2023 | Agbamu | .............. | G06V 40/172 |
| | | | | 705/325 |
| 2023/0252233 A1* | 8/2023 | Gutierrez | ................ | G06F 40/20 |
| | | | | 704/9 |
| 2024/0134874 A1* | 4/2024 | Blonski | ................. | G06F 3/0482 |
| 2024/0202539 A1* | 6/2024 | Poirier | ................... | G06F 40/20 |
| 2024/0296276 A1* | 9/2024 | Hattangady | .............. | G06N 3/09 |
| 2024/0354567 A1* | 10/2024 | Duggal | ................. | G06N 3/006 |
| 2024/0362208 A1* | 10/2024 | Naufel | ................... | G06N 20/00 |
| 2024/0370709 A1* | 11/2024 | Siebel | .................... | G06N 3/047 |
| 2024/0378391 A1* | 11/2024 | Bradley | ................. | G06F 40/35 |
| 2024/0386477 A1* | 11/2024 | Johnston | ........... | G06Q 30/0641 |
| 2024/0403545 A1* | 12/2024 | Nahum | ................ | G06F 40/174 |

* cited by examiner

300

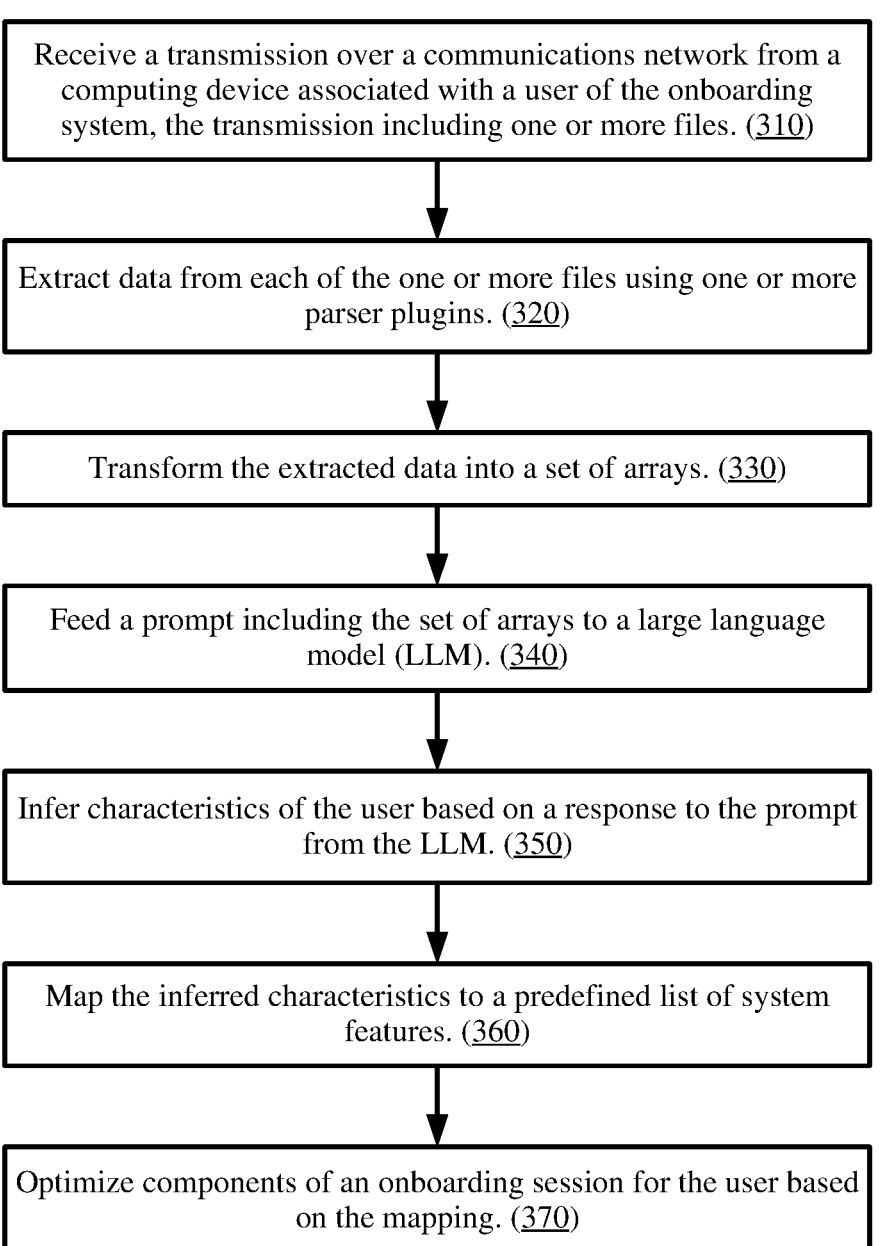

Receive a transmission over a communications network from a computing device associated with a user of the onboarding system, the transmission including one or more files. (310)

Extract data from each of the one or more files using one or more parser plugins. (320)

Transform the extracted data into a set of arrays. (330)

Feed a prompt including the set of arrays to a large language model (LLM). (340)

Infer characteristics of the user based on a response to the prompt from the LLM. (350)

Map the inferred characteristics to a predefined list of system features. (360)

Optimize components of an onboarding session for the user based on the mapping. (370)

*Figure 3*

FILE EXTRACTION AND VECTORIZATION FOR ONBOARDING WITH LLM

TECHNICAL FIELD

This disclosure relates generally to file extraction and vectorization, and specifically to extracting data from a user's files and adapting an onboarding session to the user based on a vectorized version of the extracted data.

DESCRIPTION OF RELATED ART

An onboarding computing system can introduce and guide a user through the features and functionalities of (i.e., onboard the user to) a new service, product, system, or platform. Although such computing systems can onboard users to any computer-implemented product or service, one example onboarding computing system introduces and guides new users through the system features and functionalities offered by QuickBooks Online (QBO). The onboarding process balances technical demands with quality of user experience, and ideally, the onboarding computing system would ensure that the user is seamlessly integrated into the new system, thereby optimizing the user's experience and productivity while efficiently utilizing the computer-based resources of the onboarding computing system, such as its processing power and memory.

If the user has previously used computing systems similar to the new system to which they are being onboarded, the user will be more familiar with the computer-implemented methods introduced, and thus, the onboarding session is more likely to be successful—that is, to result in the user continuing to use the new system. However, time is precious during an onboarding session, and when conventional computing systems present users with extensive lists of system features, technical and emotional challenges can arise. For instance, presenting users with fixed, densely populated lists of system features can extend page load times, and navigating vast feature sets might be daunting for users and/or lead to decision fatigue, which can increase the likelihood that users abandon the onboarding session or discontinue use of the service.

The efficiency and effectiveness of an onboarding computing system is even more crucial when a user is transitioning from a less technical platform. For the example described above, some users may migrate to QBO from using spreadsheets or even pen and paper, and the task of migrating all of their data and learning an entirely new system can be daunting. Although the new system may have the features necessary for successfully replacing the user's existing system, conventional onboarding computing systems may not be able to effectively identify the user's needs, and thus may not be able to effectively educate the user about the ways in which the new system can work for them, much less before the user abandons the onboarding session. In other words, even if the new service offers better features or is more efficient than the user's existing service, conventional onboarding computing systems are not well-equipped to overcome user resistance to transitioning from their familiar and comfortable system to the new one.

An ideal onboarding computing system would efficiently come to understand the user's existing system, identify the user's needs, educate the user about the new system's offerings, and effectively guide the user to an intelligent decision. Conventional onboarding computing systems, with their static and inefficient approaches, cannot satisfy these needs. Thus, more efficient and effective onboarding computing systems are needed.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for adapting an onboarding session to a user. An example method is performed by one or more processors of a system and includes receiving a transmission over a communications network from a computing device associated with a user of the onboarding system, the transmission including one or more files, extracting data from each of the one or more files using one or more parser plugins, transforming the extracted data into a set of arrays, feeding a prompt including the set of arrays to a large language model (LLM), inferring characteristics of the user based on a response to the prompt from the LLM, mapping the inferred characteristics to a predefined list of system features, and optimizing components of an onboarding session for the user based on the mapping.

Another innovative aspect of the subject matter described in this disclosure can be implemented in a system for adapting an onboarding session to a user. An example system includes one or more processors and a memory storing instructions for execution by the one or more processors. Execution of the instructions causes the system to perform operations including receiving a transmission over a communications network from a computing device associated with a user of the onboarding system, the transmission including one or more files, extracting data from each of the one or more files using one or more parser plugins, transforming the extracted data into a set of arrays, feeding a prompt including the set of arrays to a large language model (LLM), inferring characteristics of the user based on a response to the prompt from the LLM, mapping the inferred characteristics to a predefined list of system features, and optimizing components of an onboarding session for the user based on the mapping.

Another innovative aspect of the subject matter described in this disclosure can be implemented as a non-transitory computer-readable medium storing instructions that, when executed by one or more processors of a system for adapting an onboarding session to a user, cause the system to perform operations. Example operations include receiving a transmission over a communications network from a computing device associated with a user of the onboarding system, the transmission including one or more files, extracting data from each of the one or more files using one or more parser plugins, transforming the extracted data into a set of arrays, feeding a prompt including the set of arrays to a large language model (LLM), inferring characteristics of the user based on a response to the prompt from the LLM, mapping the inferred characteristics to a predefined list of system features, and optimizing components of an onboarding session for the user based on the mapping.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 3 shows an illustrative flowchart depicting an example operation for adapting an onboarding session to a user, according to some implementations.

Like numbers reference like elements throughout the drawings and specification.

DETAILED DESCRIPTION

Figure 1:
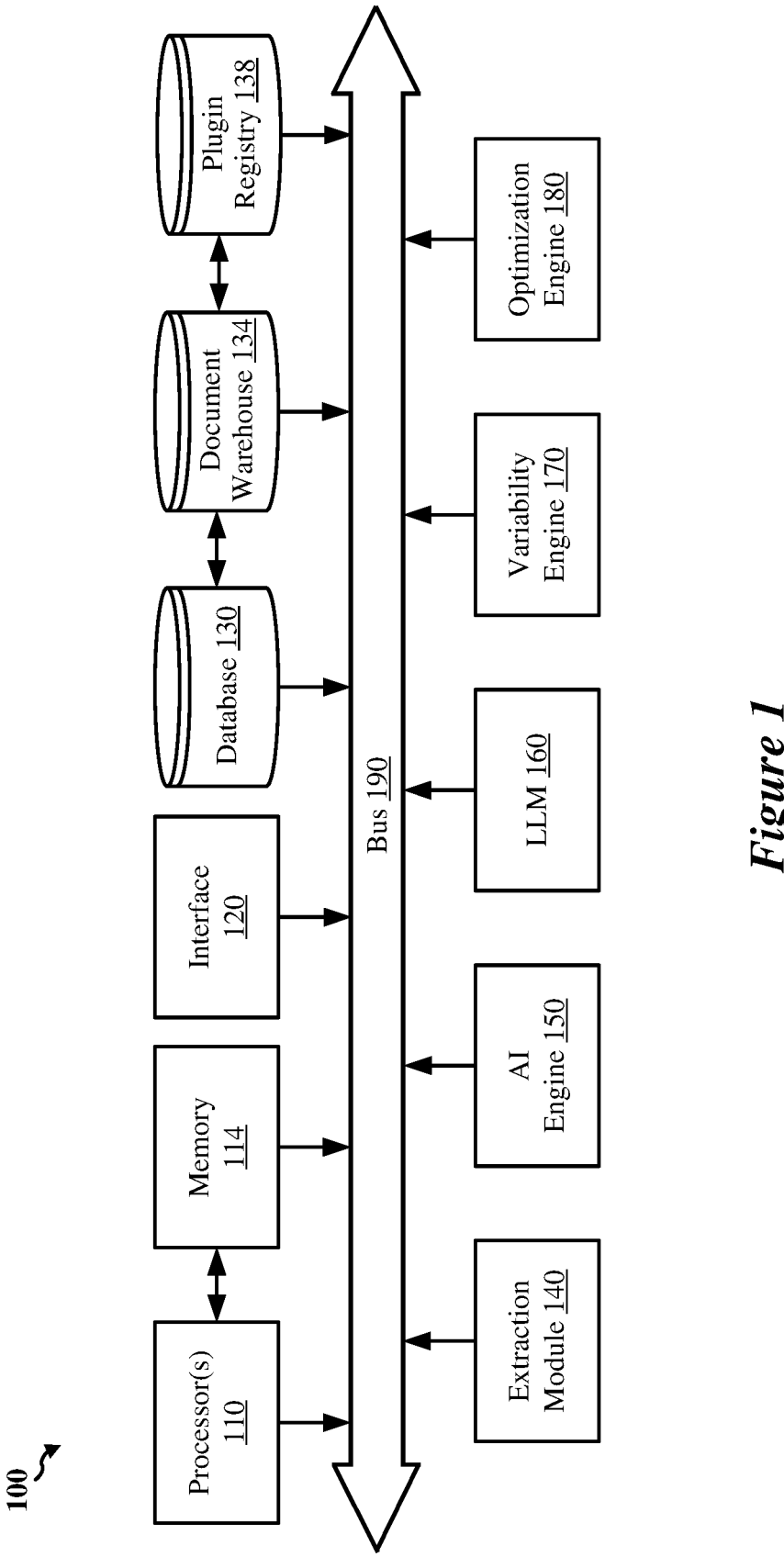
FIG. 1 shows a system, according to some implementations.

As described above, onboarding computing systems can help introduce users to the features of a new service or system, like QuickBooks Online (QBO), while balancing system resources with a quality of user experience. Onboarding becomes especially challenging when users transition from less technical platforms, as their comfort with their older systems can hinder the adoption of newer, better ones. An ideal onboarding computing system will understand the user's background, identify the user's needs, and efficiently guide the user to making an intelligent decision, unlike conventional systems which often fall short. Thus, there is a need for more efficient and effective onboarding computing systems.

Aspects of the present disclosure provide systems and methods for adapting an onboarding session to a user. Specifically, during an onboarding session, implementations of the onboarding computing system described herein can obtain one or more of the user's files (e.g., various documents, spreadsheets, and the like) that the user uses to manage their personal and/or business related information. The files may include various documents for storing unstructured or structured data, facilitating computations, generating reports, providing visual representations, or the like, and the user may be accustomed to using the files for purposes of task lists and scheduling, educational purposes, accounting and finance, inventory management, project management, data analysis, personal projects, or the like.

Upon obtaining the files, the onboarding computing system is configured to process the files, such as by extracting data from the various documents and spreadsheets and converting the data to a vectorized format. For example, depending on the file type (e.g., xlsx, csv, pdf, etc.), the onboarding computing system uses dedicated parsers and extractors (collectively referred to herein as "parser plugins") developed to read and retrieve data from the corresponding files. The parsing determines the structure of the file, while the extracting identifies particular information within the determined structure. The particular information may include a business name, an industry type, a brief description, and/or a list of banks, for example. The parsed and extracted data is then converted into a vectorized format that can be fed to a large language model (LLM) along with an expected output format. To note, by converting the data into a vectorized format, the data is optimized for the LLM because vectorized data formats are more computationally efficient when interacting with machine learning models, such as LLMs. More specifically, the vectorization standardizes the various different types of data into a unified format that can be rapidly processed via parallel processing, thereby reducing the time and processing requirements for the LLM, and thus resulting in higher efficiency and more accurate results from the LLM. For instance, by standardizing the various different types of data into a unified format, extra or confusing information (or "noise") can be removed (or "filtered") from the raw data, which may have otherwise led to increased processing time, lack of focus, and inaccuracies in the LLM's responses. Thus, the vectorization enhances both the speed and reliability of the LLM's output.

Upon obtaining the LLM's output, the onboarding computing system can infer various characteristics of the user, identify significant insights about the information the user is tracking, and surmise how the user organizes data. Specifically, the inferred characteristics and/or personalized insights can be used to identify aspects (or "components") of the onboarding session that can be adapted to the user so as to demonstrate how the new service can benefit the user, such as by demonstrating how the new service can replace the user's current one. Thereafter, such insights are used to tailor the onboarding session to display tasks, features, jobs, or the like, that are pertinent to the user, such as based on the user's inferred characteristics. Specifically, the significant insights are transformed and mapped to system features that are offered by the new system and that are relevant to the user's inferred characteristics. In this manner, the onboarding computing system can optimize the user's onboarding session on-the-fly by customizing and adapting certain components of the onboarding session to the particular user, such as within seconds of the user uploading the files to the onboarding computing system, thereby empowering the user to focus on important features during the onboarding session, relieving the user of the need to focus on irrelevant system features and extraneous details, and further reducing system resources dedicated to demonstrating less relevant system features to the user.

Although the onboarding computing system described herein can assist users with onboarding into any computer-implemented product or service, one example implementation of the onboarding computing system educates and guides new users through the system features offered by QBO. For this non-limiting example, the onboarding computing system described herein is configured to simplify a user's transition from a different financial management platform (including simply the use of spreadsheets and/or pen and paper) to QBO. By using an LLM to facilitate the onboarding computing system in inferring the user's characteristics (such as by recognizing and interpreting the nuances of a user's workflows and templates based on vectorized versions of the data and content contained within the user's files), the system can select and provide effective onboarding components adapted to the particular user, and thereafter personalize the onboarding session to the user in the example manners described herein.

As one example of the onboarding computing system intelligently inferring characteristics of the user based on extracting insights from the user's vectorized data to optimize their onboarding experience, the onboarding computing system can auto-fill fields included in the onboarding session that would typically be left blank. As a non-limiting example related to QBO (or another financial management platform incorporating the onboarding computing system described herein), if the user's spreadsheets contain the user's business name, the onboarding computing system can determine as much and automatically populate a corresponding field during the onboarding session. Additionally, information about the nature of the user's business (e.g., whether the user operates as a sole proprietorship or a partnership) can be inferred and automatically filled in during the onboarding session. Other examples may include an industry in which the user operates, a number of years the user has been in business, the user's revenue model (e.g., whether the user generates income through services or another means), and the like. By automatically detecting and auto-filling such information, time and resources may be saved for the onboarding computing system, various manual entries may be eliminated for the user, and thus the chances of the user abandoning the session may be decreased. To note, the onboarding computing system may prompt the user to confirm the accuracy of the auto-filled information, providing the user an opportunity to modify details as necessary.

As another example of the onboarding computing system intelligently inferring characteristics of the user based on extracting insights from the user's vectorized data to optimize their onboarding experience, the onboarding computing system can determine a number of services the user has already engaged with based on the information extracted from the user's files. As a non-limiting example related to QBO (or another financial management platform incorporating the onboarding computing system described herein), when a user's files indicate that the user has previously connected with certain services or applications (e.g., Mobile Payment Co, Online Payment Corp, or Craft Marketplace Inc), the onboarding computing system described herein can efficiently detect such connections, and in response, customize the user's onboarding session to direct the user to QBO's relevant components tailored for such integrations. Specifically, the onboarding computing system can identify one or more banks that the user associates with based on the information in the user's spreadsheets. In this way, rather than presenting the user with an exhaustive list of banks or prompting the user to manually input bank information, the system can generate personalized bank connection suggestions. For instance, if the system identifies transactions with Major Bank Group from the user's files, the system may customize the onboarding session to display a message such as, "It looks like you use these banks. Let's connect them to bring in transactions and generate financial insights," and further include an option for the user to confirm the connection that, once confirmed, will automatically begin the process of connecting the user's account with the service to the bank. To note, the onboarding computing system may also provide an option for the user to connect with other banks manually. In addition, the onboarding session may be optimized to allow the user to login to one or more banks during the onboarding session (e.g., by providing login credentials). In this manner, by the end of the onboarding session, the system may have already finished synchronizing with the user's bank, thus enabling the financial management service to immediately offer the user relevant transactional insights.

As another example of the onboarding computing system intelligently inferring characteristics of the user based on extracting insights from the user's vectorized data to optimize their onboarding experience, the onboarding computing system can align the user's specific needs with existing features of the service they are joining, thereby ensuring that the onboarding session remains intuitive to the user and aligns with the user's unique requirements. As a non-limiting example related to QBO (or another financial management platform incorporating the onboarding computing system described herein), if the system automatically determines that the user's usage of the previous platform (which could simply include the usage of the user's documents and spreadsheets) incorporated invoicing, components of the onboarding session may be customized to guide the user to a QBO feature specialized in generating invoicing templates. As some other examples, if the user's data suggests that they would benefit from service-related features that assist the user with managing tax deductions, cash flow management, or customer tracking, the onboarding computing system can adapt the onboarding session to emphasize these relevant features.

In other words, while conventional onboarding computing systems may be preconfigured to present users with a default list of "most popular" features or overwhelm users with extensive lists of every feature a service offers, the onboarding computing system described herein is configured to predict (or otherwise forecast, anticipate, project, or estimate) or deduce (or otherwise infer, conclude, derive, ascertain, gather, reason, assume, identify, or determine) the features the service offers that are most relevant to the user (e.g., based on the mapping further described herein), thereby enabling the onboarding computing system to select an intelligent list of features to showcase to the user based on the user's data and thus to highlight a digestible number of highly relevant functionalities during the onboarding session. As another specific example, if the system deduces (e.g., based on the data extracted from the user's files) that tax-related features are pertinent to the user and that the user has mileage and meal-related expenses, the onboarding computing system can introduce this with a statement like, "QuickBooks can help you track your expenses and categorize them for tax purposes. For example, you can use QuickBooks to track your mileage and meal expenses for business related trips. This will help you claim tax deductions for these expenses," where the personalized mention of "business trips" is based on the insights extracted from the user's data, which provides the user with a more customized experience. As another specific example, if the onboarding computing system predicts (e.g., based on the data extracted from the user's files) that features related to managing customers are relevant, the system might suggest, "QuickBooks can help you keep track of your customers on their payments. For example, you can use QuickBooks to track the payments made by your clients further training sessions. This will help you keep track of who has paid and who still owes you money," where the mention of "training sessions" indicates the system's understanding that the user offers such services, making the advice more pertinent. As another specific example, if the onboarding computing system determines (e.g., based on the data extracted from the user's files) that the user's data suggests a need for cash flow features, the onboarding computing system could customize the onboarding session to include a message such as, "QuickBooks can help you manage your cash flow by providing you with real-time information about your income and expenses. For example you can use QuickBooks to track your income from training sessions in your expenses for equipment and rent. This will help you make informed decisions about your business finances," where again, the emphasis on "training sessions" and specific expenses demonstrates how the onboarding computing system tailors the onboarding session to the user, thereby preventing the user from sifting through unrelated information. By employing this intelligent and user-specific approach, the onboarding computing system ensures that the user receives a seamless and efficient introduction to the new platform's capabilities.

As further described herein, implementations of the onboarding computing system can adapt an onboarding session to a user in near real-time by optimizing various components of the onboarding session, such as by personalizing various settings, preferences, parameters, specifications, profiles, templates, schemes, layouts, presets, attributes, properties, rules, customizations, criteria, and/or options of the onboarding session, or the like. In these and other manners, the onboarding computing system described herein may be implemented to efficiently and effectively emulate a user's interaction with their original system, thus offering the user both familiarity and adaptability.

It is to be understood that the onboarding computing system described herein can be extended to any suitable financial management system, any suitable data management system, or any other suitable online service, product, system, platform, or software solution that helps users and/or organizations manage their information and could benefit from identifying and extracting essential tasks, workflows, and templates relevant to a user's original ("source") platform and seamlessly integrating the same into a new ("destination") environment, while providing the user with a smooth experience, a personalized transition, and a sense that the "destination" system has been specifically tailored to their needs and mirrors their familiar interactions with the "source" system while simultaneously demonstrating an ability to use the "destination" system to grow with their evolving requirements.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for onboarding users. Implementations of the subject matter disclosed herein provide specific inventive steps describing how desired results are achieved and realize meaningful and significant improvements on existing computer functionality—that is, the performance of computer-based systems operating in the evolving technological field of onboarding computing systems.

FIG. 1 shows a system 100, according to some implementations. Various aspects of the system 100 disclosed herein are generally applicable for adapting an onboarding session to a user. The system 100 includes a combination of one or more processors 110, a memory 114 coupled to the one or more processors 110, an interface 120, one or more databases 130, a document warehouse 134, a document warehouse 134, an extraction module 140, an artificial intelligence (AI) engine 150, a large language model (LLM) 160, a variability engine 170, and/or an optimization engine 180. In some implementations, the various components of the system 100 are interconnected by at least a data bus 190. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for receiving (e.g., over a communications network) transmissions, input data, and/or instructions from a computing device of a user, outputting data (e.g., over the communications network) to the computing device of the user, hosting an onboarding session for the user, outputting optimized components of the onboarding session to the computing device of the user, or the like. In some implementations, the interface 120 is used to provide or receive other suitable information, such as computer code for updating one or more programs stored on the system 100, internet protocol requests and results, or the like. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The interface 120 may be used to present an onboarding session to a user, where an onboarding session can refer to a series of steps, processes, and interactions that a new user or customer encounters when they initiate use of the system 100. As the onboarding session is often the user's initial encounter with the new service, the user should be familiarized with the service's features and functionalities, and guided to input various details into the onboarding computing system. Thus, the interface 120 may also be used to provide an option to a user to upload one or more files during the onboarding session. Thereafter, the onboarding session may include many additional components, and the onboarding computing system described herein may be used to adapt any number of the subsequent components to match the current user. For instance, after collecting various details during an initial signup phase (e.g., establishment of login credentials and the like), the onboarding computing system may transition the user to a profile setup phase, during which the user may choose to upload the one or more files via the interface 120. Thereafter, more comprehensive user information may be captured, the user may be presented with an interactive or video-based tutorial or tour to enhance the user's understanding of the service's offerings, and/or the user may be presented with options to import previous data, connect related accounts, customize preferences for alerts and reports, and direct the user towards various resources, such as FAQs and/or customer support. The onboarding computing system described herein may be used to intelligently personalize some or all of such components (among others) during the onboarding session.

To note, the onboarding computing system described herein can be utilized to integrate users into a new system with relation to many various tasks, such as introducing a new employee to an organization, facilitating a company's transition to a new software solution, guiding users in setting up online services or devices, facilitating users through workshops, aiding in property rentals, assisting with enrollment in a monthly subscription service, orienting members to a loyalty program, enrolling in an educational institution, and the like. For the example of onboarding a user into a financial management system (e.g., QBO), the onboarding computing system may initially ask the user how they have been managing their business prior to attending the onboarding session. For this example, in response to the user replying that they have been using spreadsheets or pen and paper to manage their business, the onboarding computing system may prompt the user to provide (e.g., upload) the one or more files that they have been using to manage their business. In some implementations, the system 100 begins processing the one or more files immediately upon the user selecting the one or more files for upload.

The database 130 stores data associated with the system 100, such as data objects, algorithms, weights, models, modules, engines, user information, values, ratios, historical data, recent data, current or real-time data, files, plugins, extracted data and/or metadata, arrays, tags, identifiers, prompts, queries, replies, insights, formats, characteristics, features, and/or components, among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the document warehouse 134, the plugin registry 138, and/or another suitable physical or cloud-based data store. In some implementations, the database 130 includes a relational database capable of presenting information as data sets in tabular form and capable of manipulating the data sets using relational operators.

The document warehouse 134 stores data associated with documents, such as documents received from users, user tags, the documents themselves, their corresponding data, values, raw data, metadata, file types, file names, file content, and/or file identifiers (IDs), or any other suitable data representative of documents. In various implementations, the document warehouse 134 is a part of or separate from the database 130 and/or the plugin registry 138. In some instances, the document warehouse 134 includes data stored in one or more cloud object storage services, such as one or more Amazon Web Services (AWS)-based Simple Storage Service (S3) buckets. In some implementations, all or a portion of the data is stored in a memory separate from the document warehouse 134, such as in the database 130, the plugin registry 138, and/or another suitable data store.

The plugin registry 138 stores data associated with plugins, such as the plugins themselves, which may be parser plugins as described herein, or any other suitable data associated with plugins. In various implementations, the plugin registry 138 is a part of or separate from the database 130 and/or the document warehouse 134. In some instances, the plugin registry 138 includes data stored in one or more cloud object storage services, such as one or more Amazon Web Services (AWS)-based Simple Storage Service (S3) buckets. In some implementations, all or a portion of the data is stored in a memory separate from the plugin registry 138, such as in the database 130, the document warehouse 134, and/or another suitable data store.

The extraction module 140 may be used to receive one or more files from a user. Specifically, the extraction module 140 may receive a transmission over a communications network from a computing device associated with the user, where the transmission includes the one or more files. As some non-limiting examples, the one or more files may include at least one of a spreadsheet, a text file, or a portable document. In some instances, the user may choose to upload the one or more files to the system 100 via the interface 120, such as during an onboarding session in which the user is participating. As further described below, each of the one or more files may include at least a file name (e.g., a name assigned to the file by the user) and a set of content. In some instances, one or more of the file names and/or the content includes information pertaining to an organization associated with the user, such as information about customers of or expenses incurred by the user's organization.

To note, the files received from the user may be of any suitable format, size, or type. For instance, the files may be in a text format (e.g., .txt, .json, .xml, .csv), a word processing format (e.g., .doc, .docx), a spreadsheet format (e.g., .xls, .xlsx, .ods), a portable document format (e.g., .pdf), a database format (e.g., .mdb, .accdb), a web format (e.g., .html, .css, .js), or any other suitable format that at least one of the parser plugins included in the plugin registry 138 is configured to process. Specifically, files of a spreadsheet format may include digital representations of tables used to organize, analyze, and store the user's data in a tabular format including an array of rows and columns, in which the user may manage both structured and unstructured data. The system 100 is configured to receive and process spreadsheets from the user regardless of their usage, related tasks, or type, such as whether the user uses the spreadsheets for tasks like budgeting, scheduling, tracking, pivot tables, analysis of large datasets, data visualization of charts or graphs, modeling, forecasting, calculations, scripting, collaboration, or the like, and whether the spreadsheet is generated using any type of spreadsheet software application, such as Microsoft Excel, Google Sheets, Apple Numbers, LibreOffice Calc, OpenOffice Calc, Soho Sheet, Quip Spreadsheets, or the like. In some implementations, if the system 100 is not configured to process a particular type of file (e.g., if the plugin registry 138 does not include at least one parser plugin configured to process a file of the particular type), the system 100 may inform the user (e.g., via a message over the interface 120) that the file will not be processed.

The extraction module 140 may also be used to transmit each of the one or more files to a document warehouse, such as the document warehouse 134. Each respective file of the one or more files may be assigned a unique file ID, and the file ID may be indicative of at least a type (and/or format) of the respective file. As some non-limiting examples, the system 100 determines that a respective file is a modern Excel-based spreadsheet, a text file in CSV format, or a PDF, the unique file ID assigned to the respective file may include at least the characters 'XLSX', 'CSV', or 'PDF', respectively. In some instances, the file ID may be based on one or more different attributes of the respective file, such as attributes related to the name or content of the respective file, a size of the respective file, a timestamp, location, path, checksum, hash value, extension, version, tag, label, link, reference, log, comment, annotation, encoding, compression, protection, encryption, or dependency associated with the respective file, or any other suitable attribute of the respective file. In some implementations, each of the one or more files is assigned a tag associated with the user that uploaded the file.

The extraction module 140 may also be used to extract data from each of the one or more files. For instance, the extraction module 140 may extract, from each respective file, a set of data including at least one of raw data included in the respective file (e.g., content), a name assigned to the respective file (e.g., a file name), or metadata associated with the respective file (e.g., a file type). In some implementations, the data extracted from each file is stored in the document warehouse 134, and each set of data is associated with the file from which it was extracted based on the file ID generated for the file.

The extraction module 140 may also be used to assign one of a plurality of parser plugins to each file based on the type of the file. For instance, the extraction module 140 may be configured to retrieve the file IDs generated for the one or more files from the document warehouse 134, and determine a type of each file based on the file ID. Upon determining the type of each file, the extraction module 140 may assign an appropriate parser plugin for each file (e.g., and associate the assigned plugin with the corresponding file ID) based on the determined file types. In some implementations, the parser plugins are stored in a plugin registry, such as the plugin registry 138. As a non-limiting example, if the unique file ID assigned to a respective file includes the characters 'XLSX', 'CSV', or 'PDF', the extraction module 140 may select a parser plugin from the plugin registry 138 that is customized for parsing modern Excel-based spreadsheets, text files in CSV format, or PDFs, respectively, where parsing a file involves reading and structuring its content based on predefined rules and converting the data into a computer-readable format.

Specifically, the extraction module 140 and the parser plugins within the plugin registry 138 utilize a range of libraries and modules, such as libraries and modules associated with Python. For example, an Excel-based file may be allocated to a specialized parser plugin designed to convert data from such files into arrays using features of openpyxl or another appropriate file parsing module tailored for extracting text and data from spreadsheet files organized by rows and columns. Additional libraries, like xlsx.js for JavaScript, Apache POI for Java, and EPPlus for .NET/C#, may also be used for their corresponding purposes. In some instances, the Microsoft Excel API may be used directly. Additionally, various parser modules can be customized for extracting data from different file formats. For instance, the parser plugins handling CSV files may incorporate aspects of the pandas and/or NumPy libraries, and plugins designed for parsing PDF files may utilize features of tabula-py and/or PDFPlumber when enhanced table and content extraction capabilities are desired. In some instances, the extraction module 140 may select a different parser plugin for PDF files, like Tesseract for OCR, such as when a user's PDF contains one or more scanned images. Outside of Python, the system 100 may utilize various other tools such as Microsoft Excel, LibreOffice Calc, Notepad++, along with several different libraries in Java, JavaScript, R, and C# to extract and parse data. Some other example modules include lxml for XML and HTML, json for JSON, and tarfile or zipfile for .tar or .zip archives.

The extraction module 140 may also be configured to transmit a request to process the one or more files. For instance, upon obtaining the file IDs from the document warehouse 134, the extraction module 140 may transmit a request to process the one or more files to the AI engine 150, the request including the file IDs. By including the file IDs in the request and refraining from including the files in the request, the extraction module 140 conserves file transfer time and valuable processing and memory resources. In some implementations, the extraction module 140 may determine which file IDs to include in the request based on tags assigned to the corresponding files that are associated with the user that uploaded the files. In implementations that the extraction module 140 assigns a parser plugin to each file, the request may also indicate, for each file ID, the parser plugin assigned to the corresponding file.

The AI engine 150 may be used to retrieve the data extracted from the one or more files. For instance, upon receiving the request to process the one or more files from the extraction module 140, the AI engine 150 may obtain the one or more files (e.g., the data extracted from the one or more files) from the document warehouse 134 based on the file IDs identified in the request. In some implementations, the AI engine 150 (rather than the extraction module 140) may be used to assign a parser plugin to each file (e.g., based on the file types). In some implementations, the AI engine 150 is a general purpose "Generative AI Orchestrator" including components for serving and calling upon various generative AI-based applications, such as the AI-based components described herein (e.g., the LLM 160).

The AI engine 150 may also be used to transform the extracted data into a set of arrays. Specifically, the AI engine 150 may transfer (or at least initiate a transfer of) each respective file identified in the request to the parser plugins assigned to the file IDs identified in the request. Thereafter, the AI engine 150 may obtain one or more outputs from the corresponding parser plugins, where the one or more outputs include at least a set of arrays (in a vectorized format) generated based on the data extracted from the files, where vectorized refers to the data being converted from an initial type (e.g., text, image, categorical, etc.) into a numerical format suitable for computational tasks and formatted as a collection of items stored at contiguous memory locations. In other words, the AI engine 150 transforms the data extracted from a given user's files into numerical representations that can be processed by algorithms (e.g., machine learning models, such as those incorporated into the LLM 160) based on outputs from the parser plugins selected. By mapping the vectorized data to arrays, the data can be used for various quantitative techniques to generate analysis, predictions, and classifications, as further described below.

As a non-limiting example, the set of arrays may include a first array generated based on the names of the user's files, such that the first array may be suggestive of one or more organizational insights related to the user. Thus, if the user has systematically named their files, the first array can function as a concise summary of the data contained within the files, thereby enabling organizational insights to be drawn based on the first array. For instance, the first array may be named "sheetNames" and contain a single string listing the names of the user's files separated by commas, such as "Expense 2022, Expenses 2023, Revenue 2022, Revenue 2023, Inventory 2022, HR Records 2021, Expense 2021." Using the output from the LLM 160 (as further described below), the system 100 may draw various organizational inferences about characteristics of the user's organizational style. For this example, the onboarding computing system may determine that the user appears to possess a characteristic of "segments files by year", which suggests that the user is interested in trend analysis. Furthermore, the range of the user's categories implies that the user is involved with a diverse set of operations. Additionally, the absence of 2023 records for inventory suggests that the user may be interested in assistance with preparing such records.

As another non-limiting example, the set of arrays may include a second array generated based on raw data included in the user's files, such as raw strings extracted from the user's files, such that the second array is suggestive of qualitative insights related to the user. For instance, the second array may be named "rawStrings" and contain a single string listing all of the individual strings contained in the user's files separated by commas, where a condensed example may include "City of SF, Tolls, Payment from Customer." Using the output from the LLM 160 (as further described below), the system 100 may draw various qualitative inferences about characteristics of the user. For this example, the onboarding computing system may determine that the user possesses characteristics of "likely conducting operations related to the City of San Francisco", "possibly dealing with transportation or tolls", and "receiving payments from customers". Furthermore, based on the naming convention "City of SF", the onboarding computing system may infer that the user possesses a characteristic of "often refers to cities by their abbreviations" and thus toggle various preferences within the system that enable concise naming conventions. Additionally, the mention of "Tolls" may suggest that the user has financial transactions related to transportation and may thus be interested in features or modules that can assist the user with the same. Similarly, the mention of "Payment from Customer" indicates that the user conducts business interactions related to sales and may thus be interested in features or modules that can assist the user with the same. In other words, the "rawStrings" array gives the system 100 a qualitative view of the type of transactions or operations the user is involved in, in addition to context about the user's activities and/or priorities, thereby enabling the onboarding computing system to use this data to adapt the onboarding session to the user based on the observed patterns.

As another non-limiting example, the set of arrays may include a third array generated based on content extracted from the user's files, such as a correlation of values stored in rows and columns contained within the user's files, such that the third array is suggestive of quantitative insights related to the user. For instance, "rawData" may include "Sheet1" with rows representing data such as "Revenue for January" or "Expenses for February", each subdivided into columns for entries within the corresponding spreadsheet. Similarly, "rawData" may include "Sheet2" that would represent its own rows and columns. In contrast to the one-dimensional arrays described above (e.g., "sheet- Names" and "rawStrings"), the third array (e.g., "rawData") may be two-dimensional and thus provide more depth about the structure and content related to the user's files in a grid-like manner, thereby representing the relationships between data points across rows and columns, such as in the user's various spreadsheets. In this manner, using the output from the LLM 160 (as further described below), the system 100 may deduce valuable quantitative insights from the third array. For instance, the onboarding computing system may infer that the user possesses a characteristic of "habitually budgets on a monthly basis" based on identifying patterns in "Sheet1", gaps in the data may suggest to the onboarding computing system that the user may desire assistance or features that could help the user more efficiently or completely record or track their finances. Furthermore, patterns within the grid-like style of the third array may enable the onboarding computing system to deduce the user's various preferences, such as for hierarchies, segmentation of information, or periodicity in data entry.

The AI engine 150 may also be used to generate a prompt for an LLM (e.g., the LLM 160) based on the set of arrays. Specifically, the AI engine 150 may include the set of arrays in the prompt. In some implementations, the AI engine 150 may also generate an expected output format for the LLM 160, which may be combined with the set of arrays and included in the prompt. The expected output format may include queries seeking responses (e.g., from the LLM 160) related to the set of arrays. In some instances, the set of arrays or the expected output format may be in a typescript interface format. In some other instances, the AI engine 150 may refrain from including the expected output format in the prompt, particularly if the LLM 160 is preconfigured to deliver such a format when given a prompt featuring a set of arrays. In short, by embedding the arrays in the prompt, the prompt is designed to instruct the LLM 160 to analyze the arrays and generate a response including answers to the queries as defined by the expected output format.

The AI engine 150 may also be used to feed the prompt to the LLM 160, where the prompt includes at least one of the set of arrays or the set of queries relevant to the user's onboarding session. Specifically, a structured (e.g., vectorized) version of the (e.g., unstructured) data extracted from the user's one or more files is fed to the LLM 160 with a request to generate onboarding-relevant replies in a different, structured (e.g., vectorized) format. In some instances, the structured format is a TypeScript interface, which may advantageously be well-understood by the LLM 160 due to its training data including a relatively high number of TypeScript examples. In some implementations, at least one of the set of arrays or the set of queries is fed to the LLM 160 separately from the prompt. For instance, at least one of the set of arrays or the set of queries relevant to the user's onboarding session may be fed to the LLM 160 in a custom instructions format, in an uploaded attachment, in a different prompt, or the like.

As described above, the prompt may include the set of arrays and an expected output format. A non-limiting example of the expected output format follows, where the example could apply when the onboarding computing system is being implemented to optimize an onboarding session for QBO or another suitable financial management platform:

```
interface Message {{
businessName: string;
businessDescription: string;
businessType: "SoleProprietor" | "Partnership" | "S-Corp" | "C-Corp" | "Non-profit" | "NotSure";
```

-continued

```
industryName: string;
industryCode: number;
banks: [ "GLOBAL_FINANCE_CORP" | "MAJOR_BANK_GROUP" |
"NATIONWIDE_BANKING_INC" | "TRUSTWORTHY_BANK_CO" |
"CREDIT_CARD_BANKING_LTD" | "REGIONAL_BANK_USA" |
"ONLINE_PAYMENT_CORP" | "COMMUNITY_BANK_HOLDINGS" ];
businessAgeRange: "UnderAYear" | "1to2" | "3to5" | "6to10" | "MoreThan10";
businessMakeMoney: "Provide Services" | "Sell Products" | "Something else";
jobs: {{
customers: string;
taxDeductions: string;
cashflow: string;
}}
}}.
```

The example expected output format named "Message" instructs the LLM 160 about the response being requested using a set of queries (e.g., businessName: string, etc.). Specifically, the expected output format instructs the LLM 160 about how to process the raw data contained within the set of arrays. For this example, the expected response will include data regarding the nature of the user's business, such as its name and description, and the LLM 160 is expected to insert its determined responses within corresponding businessName and businessDescription fields, respectively. Similarly, the LLM 160 is expected to determine a type of the user's business (a classification), an industry affiliation, banks associated with the user's business (a classification), etc., and map each determination to its respective field, e.g., businessType, industryName, banks, etc. Continuing this example, the LLM 160 is expected to determine a relative age of the user's business based on the user's files, how the user's business primarily earns revenue, and further to infer various other characteristics about the user's customers, tax deductions, and cashflow, which the LLM 160 is then expected to generate under corresponding fields for businessAgeRange (a classification), businessMakeMoney (a classification), and jobs (plain language strings), respectively. It is to be understood that the example expected output format is but one of any number of expected output formats that may be fed to the LLM 160, depending on the nature of the service or platform to which the user is being onboarded. In some implementations, the set of queries included in the prompt may include an open-ended request for one or more general insights about the user based on the data contained within the set of arrays, and any general insights generated by the LLM 160 may be used (e.g., by the variability engine 170 and the optimization engine 180 in the manners described below) to optimize the onboarding session to the user accordingly.

The AI engine 150 may also be used to receive a response to the prompt from the LLM 160. The LLM 160 may be any suitable generative AI model trained on a large corpus of text to generate written responses, answer questions, and assist with various language-related tasks. To note, the LLM 160 may use various AI accelerators to process vast amounts of textual data (e.g., from the internet), utilize artificial neural networks (ANNs) with millions to billions or even trillions of weights or parameters, be trained through self-supervised and/or semi-supervised methods, incorporate one or more aspects of the transformer architecture and/or mixture of experts (MoE), operate in part based on predicting a next token or word from an input, perform various natural language processing (NLP) tasks, and include multiple layers of transformer blocks configured using aspects of deep learning to recognize and generate language patterns by processing the vast amounts of textual data using the billions or even trillions of parameters or weights. Example LLMs may include OpenAI's ChatGPT, Google's Bard (PaLM), Meta's LLaMa, BigScience's BLOOM, Baidu's Ernie 3.0 Titan, Anthropic's Claude, or another suitable type of neural network compatible with prompt engineering techniques.

As described above, the response from the LLM 160 may include a set of replies to the set of queries defined by the expected output, and thus the response should be in the expected output format. For the example prompt described above, a non-limiting example response is as follows:

```
interface Response {{
businessName: TechSolutions Inc.;
businessDescription: A tech company providing IT solutions for small to mid-sized businesses.;
businessType: "S-Corp";
industryName: Information Technology;
industryCode: 62020;
banks: [ "MAJOR_BANK_GROUP", "CREDIT_CARD_BANKING_LTD",
"ONLINE_PAYMENT_CORP" ];
businessAgeRange: "3to5";
businessMakeMoney: "Provide Services";
jobs: {{
customers: Manages and supports clients' IT infrastructures.;
taxDeductions: Claims deductions for software purchases and IT equipment.;
cashflow: Monitors monthly subscriptions and manages billing cycles.;
}}
}}.
```

Thus, based on processing the set of arrays, the example output response indicates that the business associated with the user that uploaded the files from which the arrays were generated is named "TechSolutions Inc," which is a tech company providing IT solutions for small to mid-sized businesses, is categorized as an "S-Corp," operates within the Information Technology sector, is designated under industry code 62020, is financially affiliated with three banking institutions (Major Bank Group, Credit Card Banking Ltd, and Online Payment Corp), has been operating for a duration falling between 3 to 5 years, primarily generates revenue from providing services, which, in this context, entails managing and supporting the IT infrastructure of their clients. Furthermore, the business claims tax deductions on expenses related to software purchases and IT equipment, and the business is involved with monitoring monthly subscriptions and managing billing cycles. The AI engine 150 may provide the response from the LLM 160 to the variability engine 170 for further processing, or the variability engine 170 may otherwise obtain the response from the LLM 160. In some instances, the system 100 further includes an integration with a customer data platform (e.g., a "Customer 360" Salesforce service), which may provide a "comprehensive, 360-degree perspective on a customer's profile." In such instances, when the system 100 identifies various details about the user as described by examples above (e.g., the user's business name and description), the system 100 may further store such data within the Customer 360 platform, thereby ensuring its ease of access and retrieval at subsequent times.

The variability engine 170 may be used to infer characteristics of the user based on the response to the prompt obtained from the LLM 160. Specifically, the variability engine 170 may infer the user's characteristics based on the set of replies included in the response. For example, the set of replies may include information suggestive of representational characteristics of the user, such as that the user prefers visual aids over textual descriptions. As another example, the set of replies may include information suggestive of descriptive characteristics of the user, such as that the user is a 35-year-old software engineer from Seattle. As another example, the set of replies may include information suggestive of statistical characteristics of the user, such as that the user has a 70% propensity to be interested in content related to the stock market. As another example, the set of replies may include information suggestive of historical characteristics of the user, such as that the user has previously worked in three different technology companies over the last decade. As another example, the set of replies may include information suggestive of relational characteristics of the user, such as that the user might be connected or related to one or more notable individuals within the legal industry. As another example, the set of replies may include information suggestive of functional characteristics of the user, such as that the user possesses skills related to programming in Java and Python. As another example, the set of replies may include information suggestive of preferential characteristics of the user, such as that the user prefers using Android over iOS devices. As another example, the set of replies may include information suggestive of operational characteristics of the user, such as that the user prefers to work in the evenings rather than in the mornings. As another example, the set of replies may include information suggestive of procedural characteristics of the user, such as that the user uses checklists to manage productivity. As another example, the set of replies may include information suggestive of logistical characteristics of the user, such as that the user often travels for business and prefers direct flights. As another example, the set of replies may include information suggestive of structural characteristics of the user, such as that the user's business is structured as a flat organization with no hierarchy. As another example, the set of replies may include information suggestive of institutional characteristics of the user, such as that the user has been a member of the Association for Computing Machinery (ACM) for five years. As another example, the set of replies may include information suggestive of technological characteristics of the user, such as that the user frequently utilizes cloud-based storage solutions for data backup.

The variability engine 170 may also be used to map the inferred characteristics to system features. Specifically, the variability engine 170 may identify, for each inferred characteristic, at least one system feature included among a predefined list of system features determined to correlate with (or otherwise be suitable for) users that possess the inferred characteristic. In addition, or in the alternative, the variability engine 170 may identify, for each inferred characteristic, at least one system feature included among the predefined list of system features determined to not correlate with (or otherwise not be suitable for) users that possess the inferred characteristic. In this manner, the variability engine 170 identifies a set of system features suitable for the user, and in addition or in the alternative, identifies a set of system features not suitable for the user.

To continue the non-limiting examples described above, if the variability engine 170 infers that the user prefers visual aids over textual descriptions, the variability engine 170 may map said characteristic to a system feature that would involve personalizing the user interface to display more infographics and icons. As another example, if the variability engine 170 infers that the user is a 35-year-old software engineer from Seattle, the variability engine 170 may map said characteristic to a system feature that would involve offering Seattle-based tech meet-ups or seminars in an events section of the user's session. As another example, if the variability engine 170 infers that the user has a 70% propensity to be interested in content related to the stock market, the variability engine 170 may map said characteristic to a system feature that would involve prioritizing stock market news and alerts on a dashboard section of the onboarding session. As another example, if the variability engine 170 infers that the user has previously worked in three different technology companies over the last decade, the variability engine 170 may map said characteristic to a system feature that would inform the user that the system can suggest networking groups or communities relevant to related technologies. As another example, if the variability engine 170 infers that the user might be connected or related to one or more notable individuals within the legal industry, the variability engine 170 may map said characteristic to a system feature that would involve toggling a setting that would enable the curation of legal industry news and forum discussions for the user. As another example, if the variability engine 170 infers that the user possesses skills related to programming in Java and Python, the variability engine 170 may map said characteristic to a system feature that would suggest that the user additionally enroll in a different service related to programming that is also associated with the service to which the user is being onboarded. As another example, if the variability engine 170 infers that the user prefers using Android over iOS devices, the variability engine 170 may map said characteristic to a system feature that would involve adjusting the interface and functionality for an optimal Android experience. As another example, if the variability engine 170 infers that the user prefers to work in the evenings rather than in the mornings, the variability engine 170 may map said characteristic to a system feature that would involve scheduling system maintenance or updates outside of the user's preferred working hours. As another example, if the variability engine 170 infers that the user uses checklists to manage productivity, the variability engine 170 may map said characteristic to a system feature that would involve using checklists to encourage the user to perform important tasks. As another example, if the variability engine 170 infers that the user often travels for business and prefers direct flights, the variability engine 170 may map said characteristic to a system feature that would let the user know that the system will highlight direct flight options for any travel arrangements. As another example, if the variability engine 170 infers that the user's business is structured as a flat organization with no hierarchy, the variability engine 170 may map said characteristic to a system feature that would disable a set of more complex organizational charting tools. As another example, if the variability engine 170 infers that the user has been a member of the Association for Computing Machinery (ACM) for five years, the variability engine 170 may map said characteristic to a system feature that would involve offering ACM-specific content or partnership discounts. As another example, if the variability engine 170 infers that the user frequently utilizes cloud-based storage solutions for data backup, the variability engine 170 may map said characteristic to a system feature that would suggest linking the user's various cloud-based storage solutions and automatically enabling corresponding backup reminders. In some implementations, the variability engine 170 assigns a suitability score to each of the mapped system features, such as based on one or more confidence scores.

The optimization engine 180 may be used to select a subset of the system features based on the mapping. For instance, the optimization engine 180 may obtain the suitability scores from the variability engine 170 and select a subset of the system features having the highest suitability scores, suitability scores above a threshold, or the like. In addition, or in the alternative, the variability engine 170 may select a subset of the system features having the lowest suitability scores, suitability scores below a threshold, or the like. By selecting subsets of system features having the highest suitability scores, and in addition or in the alternative, the lowest suitability scores, the optimization engine 180 identifies the system features most relevant to adapting an onboarding session to the user.

Continuing the example above, it will be assumed that, for the current user, the example mapped system features are associated with suitability scores as follows: personalize the user interface to display more infographics and icons [suitability score 74%], offer the user Seattle-based tech meet-ups or seminars [suitability score 85%], prioritize stock market news and alerts [suitability score 54%], inform the user that the system can suggest networking groups or communities relevant to related technologies [suitability score 32%], toggle a setting that would enable the curation of legal industry news and forum discussions for the user [suitability score 79%], suggest that the user additionally enroll in a different service related to programming that is also associated with the service to which the user is being onboarded [suitability score 59%], adjust the interface and functionality for an optimal Android experience [suitability score 73%], schedule system maintenance or updates outside of the user's preferred working hours [suitability score 76%], use checklists to encourage the user to perform important tasks [suitability score 83%], let the user know that the system will highlight direct flight options for any travel arrangements [suitability score 70%], disable a set of more complex organizational charting tools [suitability score 90%], offer ACM-specific content or partnership discounts [suitability score 44%], suggest linking the user's various cloud-based storage solutions and automatically enabling corresponding backup reminders [suitability score 51%]. Thus, for this example, if the suitability score threshold is set to 70%, the optimization engine 180 may select the subset of system features to include: personalize the user interface to display more infographics and icons, offer the user Seattle-based tech meet-ups or seminars, toggle a setting that would enable the curation of legal industry news and forum discussions for the user, adjust the interface and functionality for an optimal Android experience, schedule system maintenance or updates outside of the user's preferred working hours, use checklists to encourage the user to perform important tasks, let the user know that the system will highlight direct flight options for any travel arrangements, and disable a set of more complex organizational charting tools. In other words, the optimization engine 180 identifies said features as the system features most relevant to the user. In contrast, for this example, the optimization engine 180 may refrain from including the following system features from the selected subset: prioritize stock market news and alerts, inform the user that the system can suggest networking groups or communities relevant to related technologies, suggest that the user additionally enroll in a different service related to programming that is also associated with the service to which the user is being onboarded, offer ACM-specific content or partnership discounts, suggest linking the user's various cloud-based storage solutions and automatically enabling corresponding backup reminders. In some implementations, the optimization engine 180 solicits one or more preferences from the user about one or more of the system features (e.g., potential optimizations to the onboarding session), thereby enabling the user to select at least a portion of the subset of system features based on the mapping. For instance, the optimization engine 180 may solicit a preference from the user about whether to enable the system features associated with a suitability score below the threshold and/or above a different threshold.

The optimization engine 180 may also be used to optimize components of the onboarding session for the user based on the mapping. Specifically, components of the onboarding session may be optimized for the user based on the subset of system features identified as most relevant to the user. In other words, certain components of the onboarding session may be optimized for (or otherwise adapted to) the user by emphasizing, activating, manipulating, customizing, engaging, enabling, toggling, or otherwise initiating the components in a manner consistent with the system features identified as most suitable for (or relevant to) the user. Continuing the example above, the optimization engine 180 may execute, during the onboarding session, each of the following for the example user described above: personalize the user interface to display the more infographics and icons, (at least initiate an action to) offer the user Seattle-based tech meet-ups or seminars, toggle the setting that enables the curation of legal industry news and forum discussions, adjust the interface and functionality for an optimal Android experience (e.g., in accordance with predetermined settings), schedule the system maintenance or updates outside of the user's preferred working hours, generate one or more messages for the user about important tasks that include checklists, inform the user that the system will highlight direct flight options for travel arrangements, and disable the set of more complex organizational charting tools.

As some additional non-limiting examples, in a manner consistent with the features most suitable for the user, the optimization engine 180 may autopopulate one or more relevant fields for the user, present a relevant message to the user, direct the user to a relevant service, provide a suggested relevant action to the user, initiate an operation relevant to the user, enable one or more settings relevant to the user, and/or perform actions similar to any of the non-limiting examples described above. As some additional or alternative non-limiting examples, in a manner consistent with the features least suitable for the user (e.g., scoring below a threshold), the optimization engine 180 may refrain from autopopulating one or more relevant fields for the user, refrain from presenting a relevant message to the user, refrain from directing the user to a relevant service, refrain from providing a suggested relevant action to the user, refrain from initiating an operation relevant to the user, or refrain from enabling one or more settings relevant to the user, and/or refrain from performing certain actions similar to the non-limiting examples described above. Thus, the system 100 may output the optimized components of the onboarding session to the user, or otherwise execute the optimized components, such as via the interface 120. In some implementations, the optimized components are output to the user during the same onboarding session in which the corresponding files are received from the user, such as within seconds of receiving the files. In some instances, such as when extensive processing occurs (e.g., the system 100 requires more than a threshold number of seconds to process the user's files), an asynchronous pushing mechanism (e.g., a GenOS system) may be employed, thereby preventing the user from remaining idle during the extended processing time, thereby enhancing the in-session customer experience (ICE). By asynchronously pushing the data extracted from the files during times of high processing demands, the system 100 ensures that delays in background processing do not negatively impact the user's experience during the onboarding session.

The extraction module 140, the AI engine 150, the LLM 160, the variability engine 170, and/or the optimization engine 180 are implemented in software, hardware, or a combination thereof. In some implementations, any one or more of the extraction module 140, the AI engine 150, the LLM 160, the variability engine 170, or the optimization engine 180 is embodied in instructions that, when executed by the processor 110, cause the system 100 to perform operations. In various implementations, the instructions of one or more of said components, the interface 120, the document warehouse 134, and/or the plugin registry 138, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples of adapting an onboarding session to a user are described with reference to the system 100, other suitable system configurations may be used.

Figure 2:
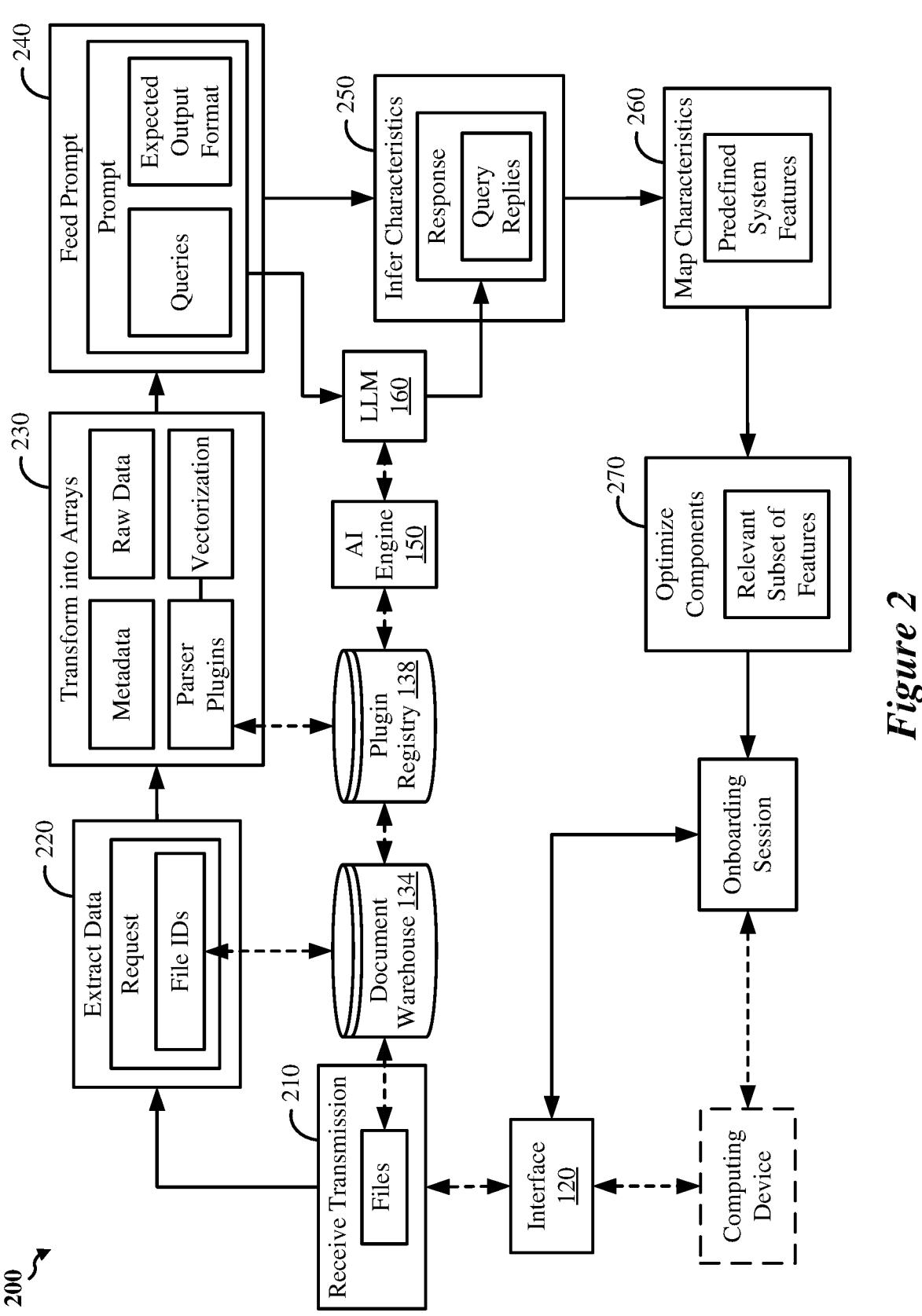
FIG. 2 shows a high-level overview of an example process flow employed by a system, according to some implementations.

FIG. 2 shows a high-level overview of an example process flow 200 employed by a system, according to some implementations, during which an onboarding session is adapted to a user. In various implementations, the system incorporates one or more (or all) aspects of the system 100. In some implementations, various aspects described with respect to FIG. 1 are not incorporated, such as the document warehouse 134 and/or the plugin registry 138.

At block 210, the system 100 receives a transmission over a communications network from a computing device associated with a user of the onboarding computing system, the transmission including one or more files. In some implementations, the system 100 provides an interface (e.g., the interface 120) via which the user can choose to upload the one or more files to the onboarding computing system during an onboarding session, and the one or more files are received via the interface. In some instances, the one or more files include at least one of a spreadsheet, a text file, or a portable document, and each of the one or more files includes at least a file name and content, where the content of one or more of the files includes information pertaining to an organization associated with the user. In some implementations, the system 100 transmits each of the one or more files to a document warehouse (e.g., the document warehouse 134), where each of the one or more files is assigned a tag associated with the user, and where each respective file of the one or more files is assigned a unique file identifier (ID) indicative of at least a type of the respective file.

At block 220, the system 100 extracts data from each of the one or more files using one or more parser plugins. In some implementations, the system 100 receives the file IDs from the document warehouse 134, and transmits, to an artificial intelligence (AI) engine (e.g., the AI engine 150), a request to process the one or more files, where the request includes the file IDs. In some aspects, the AI engine includes (and/or is communicably coupled to) a plugin registry (e.g., the plugin registry 138) storing the one or more parser plugins, and each of the one or more parser plugins is customized for a particular file type.

At block 230, the system 100 transforms the extracted data into a set of arrays. In some instances, the system 100 assigns, using the AI engine 150, one of the parser plugins to each file ID based on the type of the file corresponding to the file ID, obtains the one or more files from the document warehouse 134 based on the file IDs, and transfers each respective file to the parser plugin assigned to the respective file, where the data extracted from each respective file includes at least one of raw data included in the respective file, a name assigned to the respective file, or metadata associated with the respective file. In some implementations, the set of arrays are in a vectorized format and include at least one of a first array suggestive of organizational insights related to the user based on names of the one or more files, a second array suggestive of qualitative insights related to the user based on raw strings included in the one or more files, or a third array suggestive of quantitative insights related to the user based on a correlation of values stored in each row and column contained within the one or more files.

At block 240, the system 100 feeds a prompt including the set of arrays to a large language model (LLM) (e.g., the LLM 160). In some implementations, the system 100 generates the prompt for the LLM 160 based on the set of arrays. Generating the prompt may include generating an expected output format for the LLM 160. In some aspects, the expected output format includes a set of queries each requesting a reply determined based on the set of arrays. In some instances, the expected output format is a typescript interface format. In some implementations, the system 100 receives the response to the prompt from the LLM 160, and the response includes a set of replies to the set of queries.

The response may be in the expected output format, and inferring the characteristics of the user may be based on the set of replies.

At block 250, the system 100 infers characteristics of the user based on a response to the prompt from the LLM 160. In some aspects, the characteristics are inferred based on the set of replies to the set of queries included in the prompt for the LLM 160. In various implementations, the inferred characteristics include at least one of representational, descriptive, statistical, historical, relational, functional, preferential, operational, procedural, logistical, structural, institutional, or technological characteristics of the user.

At block 260, the system 100 maps the inferred characteristics to a predefined list of system features. In some implementations, the system 100 selects a subset of the system features most relevant to the user based on the mapping.

At block 270, the system 100 optimizes components of the onboarding session for the user based on the mapping. In some aspects, the components of the onboarding session are optimized based on the relevant subset of system features selected at block 260. In various implementations, optimizing components of the onboarding session includes at least one of autopopulating one or more fields for the user, presenting a custom message to the user, directing the user to a relevant service, providing a suggested action for the user, initiating an operation related to the user, or enabling one or more settings appropriate for the user. In various implementations, optimizing components of the onboarding session includes at least one of refraining from autopopulating one or more fields for the user, refraining from presenting one or more messages to the user, refraining from directing the user to one or more services, refraining from providing one or more suggested actions for the user, refraining from initiating one or more operations, or disabling one or more settings inappropriate for the user.

In some implementations, after block 270, the system 100 outputs each of the optimized components to the user. In some aspects, the optimized components are output to the user during the same onboarding session in which the one or more files are received.

FIG. 3 shows a high-level overview of an example process flow 300 employed by the system 100 of FIG. 1 and/or the system described with respect to FIG. 2, according to some implementations, during which an onboarding session is adapted to a user. At block 310, the system 100 receives a transmission over a communications network from a computing device associated with a user of the onboarding computing system, the transmission including one or more files. At block 320, the system 100 extracts data from each of the one or more files using one or more parser plugins. At block 330, the system 100 transforms the extracted data into a set of arrays. At block 340, the system 100 feeds a prompt including the set of arrays to a large language model (LLM). At block 350, the system 100 infers characteristics of the user based on a response to the prompt from the LLM. At block 360, the system 100 maps the inferred characteristics to a predefined list of system features. At block 370, the system 100 optimizes components of an onboarding session for the user based on the mapping.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods are performed by circuitry specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or in the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A computer-implemented method for adapting an onboarding session to a user, the method performed by one or more processors of an onboarding system and comprising:

receiving, during an onboarding session for a user of the onboarding system, a transmission over a communications network from a computing device associated with the user, the transmission including one or more files;

extracting data from each of the one or more files using one or more parser plugins of a plurality of parser plugins stored in a plugin registry, each of the parser plugins customized for extracting data from files of a particular file type, and the extracted data including a first amount of noise;

vectorizing the extracted data into a set of arrays that standardize the extracted data into a unified numerical format optimized for a large language model (LLM), the standardized data including a second amount of noise less than the first amount of noise;

feeding a prompt including the set of arrays to the LLM, wherein the LLM parallelly processes the set of arrays based on the unified numerical format;

inferring one or more characteristics that the user possesses based on a response to the prompt from the LLM;

identifying, for each respective characteristic of the one or more inferred characteristics, at least one feature of the onboarding session, from a predefined list of system features, determined to be suitable for users that possess the respective characteristic;

personalizing the at least one identified feature of the onboarding session for the user based on aligning the at least one identified feature with the user's inferred characteristics;

identifying one or more features from the predefined list of system features that are not suitable for users that possess the respective characteristic;

refraining from outputting, to the user, the one or more features that are not suitable for users that possess the respective characteristic; and outputting, to the user, the at least one personalized feature of the onboarding session in at least near real-time with receiving the one or more files.

2. The method of claim 1, further comprising:

providing an interface via which the user can choose to upload the one or more files to the onboarding system during the onboarding session, wherein the one or more files are received via the interface, wherein the one or more files include at least one of a spreadsheet, a text file, or a portable document, wherein each of the one or more files includes at least a file name and content, and wherein the content of one or more of the files includes information pertaining to an organization associated with the user.

3. The method of claim 1, further comprising:

transmitting each of the one or more files to a document warehouse, wherein each of the one or more files is assigned a tag associated with the user, and wherein each respective file of the one or more files is assigned a unique file identifier (ID) indicative of at least a type of the respective file;

receiving the file IDs from the document warehouse;

transmitting, to an artificial intelligence (AI) engine, a request to process the one or more files, wherein the request includes the file IDs, and wherein the AI engine includes the plugin registry;

assigning, using the AI engine, one of the parser plugins to each file ID based on the type of the file corresponding to the file ID;

obtaining the one or more files from the document warehouse based on the file IDs; and transferring each respective file to the parser plugin assigned to the respective file, wherein the data extracted from each respective file includes at least one of raw data included in the respective file, a name assigned to the respective file, or metadata associated with the respective file.

4. The method of claim 1, wherein the set of arrays include at least:

a first array suggestive of organizational insights related to the user based on names of the one or more files;

a second array suggestive of qualitative insights related to the user based on raw strings included in the one or more files; and a third array suggestive of quantitative insights related to the user based on a correlation of values stored in each row and column contained within the one or more files.

5. The method of claim 1, further comprising:

generating the prompt for the LLM based on the set of arrays, wherein generating the prompt includes generating an expected output format for the LLM, wherein the expected output format includes a set of queries each requesting a reply determined based on the set of arrays, and wherein the expected output format is a typescript interface format; and receiving the response to the prompt from the LLM, wherein the response includes a set of replies to the set of queries, wherein the response is in the expected output format, and wherein inferring the characteristics of the user is based on the set of replies.

6. The method of claim 1, wherein the inferred characteristics include one or more preferences of the user inferred based on a content of the user's files.

7. The method of claim 6, wherein the onboarding session is for onboarding the user to a service, wherein the content of the user's files includes patterns that cause the LLM to infer that one of the user's preferences is entering their data on a periodic basis, and wherein personalizing the features of the onboarding session includes presenting one or more features of the service that could help the user more efficiently enter data periodically.

8. The method of claim 6, wherein the onboarding session is for onboarding the user to a service, and wherein personalizing features of the onboarding session includes enabling one or more settings of the service appropriate for the user based on the user's preferences.

9. The method of claim 6, wherein the onboarding session is for onboarding the user to a service, and wherein personalizing features of the onboarding session includes disabling one or more settings of the service deemed inappropriate for the user based on the user's preferences.

10. The method of claim 1, wherein the onboarding session is for onboarding the user to a service, wherein a content of the user's files causes the LLM to infer that the user has an association with a third-party entity, and wherein personalizing the features of the onboarding session includes presenting a prompt to the user naming the third-party entity and providing an option to automatically initiate an integration with the third-party entity within the service.

11. The method of claim 1, wherein the onboarding session is for onboarding the user to a service, wherein a content of the user's files causes the LLM to infer that the user regularly performs a particular activity, and wherein personalizing the features of the onboarding session includes generating a natural language message that explains a feature of the service whereby the user can perform the particular activity.

12. The method of claim 1, wherein refraining from outputting the one or more features to the user reduces computational resources or network resources for the onboarding system relative to outputting all available features.

13. A system for adapting an onboarding session to a user, the system comprising:

one or more processors; and at least one memory coupled to the one or more processors and storing instructions that, when executed by the one or more processors, cause the system to perform operations including:

receiving, during an onboarding session for a user of the onboarding system, a transmission over a communications network from a computing device associated with the user, the transmission including one or more files;

extracting data from each of the one or more files using one or more parser plugins of a plurality of parser plugins stored in a plugin registry, each of the parser plugins customized for extracting data from files of a particular file type, and the extracted data including a first amount of noise;

vectorizing the extracted data into a set of arrays that standardize the extracted data into a unified numerical format optimized for a large language model (LLM), the standardized data including a second amount of noise less than the first amount of noise;

feeding a prompt including the set of arrays to the LLM, wherein the LLM parallelly processes the set of arrays based on the unified numerical format;

inferring one or more characteristics that the user possesses based on a response to the prompt from the LLM;

identifying, for each respective characteristic of the one or more inferred characteristics, at least one feature of the onboarding session, from a predefined list of system features, determined to be suitable for users that possess the respective characteristic;

personalizing the at least one identified feature of the onboarding session for the user based on aligning the at least one identified feature with the user's inferred characteristics;

identifying one or more features from the predefined list of system features that are not suitable for users that possess the respective characteristic;

refraining from outputting, to the user, the one or more features that are not suitable for users that possess the respective characteristic; and outputting, to the user, the at least one personalized feature of the onboarding session in at least near real-time with receiving the one or more files.

14. The system of claim 13, wherein execution of the instructions causes the system to perform operations further including:

transmitting each of the one or more files to a document warehouse, wherein each of the one or more files is assigned a tag associated with the user, and wherein each respective file of the one or more files is assigned a unique file identifier (ID) indicative of at least a type of the respective file;

receiving the file IDs from the document warehouse;

transmitting, to an artificial intelligence (AI) engine, a request to process the one or more files, wherein the request includes the file IDs, and wherein the AI engine includes the plugin registry;

assigning, using the AI engine, one of the parser plugins to each file ID based on the type of the file corresponding to the file ID;

obtaining the one or more files from the document warehouse based on the file IDs; and transferring each respective file to the parser plugin assigned to the respective file, wherein the data extracted from each respective file includes at least one of raw data included in the respective file, a name assigned to the respective file, or metadata associated with the respective file.

15. The system of claim 13, wherein the set of arrays include at least:

a first array suggestive of organizational insights related to the user based on names of the one or more files;

a second array suggestive of qualitative insights related to the user based on raw strings included in the one or more files; and a third array suggestive of quantitative insights related to the user based on a correlation of values stored in each row and column contained within the one or more files.

16. The system of claim 13, wherein execution of the instructions causes the system to perform operations further including:

generating the prompt for the LLM based on the set of arrays, wherein generating the prompt includes generating an expected output format for the LLM, wherein the expected output format includes a set of queries each requesting a reply determined based on the set of arrays, and wherein the expected output format is a typescript interface format; and receiving the response to the prompt from the LLM, wherein the response includes a set of replies to the set of queries, wherein the response is in the expected output format, and wherein inferring the characteristics of the user is based on the set of replies.

17. The system of claim 13, wherein the inferred characteristics include one or more preferences of the user inferred based on a content of the user's files.

18. The system of claim 17, wherein the onboarding session is for onboarding the user to a service, wherein the content of the user's files includes patterns that cause the LLM to infer that one of the user's preferences is entering their data on a periodic basis, and wherein personalizing the features of the onboarding session includes presenting one or more features of the service that could help the user more efficiently enter data periodically.

19. The system of claim 17, wherein the onboarding session is for onboarding the user to a service, and wherein personalizing features of the onboarding session includes enabling one or more settings of the service appropriate for the user based on the user's preferences.

20. The system of claim 17, wherein the onboarding session is for onboarding the user to a service, and wherein personalizing features of the onboarding session includes disabling one or more settings of the service deemed inappropriate for the user based on the user's preferences.

* * * * *